United States Patent
Colayco (10) Patent No.: US 9,156,590 B2
(45) Date of Patent: Oct. 13, 2015

(54) SYSTEM, METHOD AND APPARATUS FOR DISPOSABLE RECEPTACLE FOR REFUSE

(75) Inventor: Jose Luis Javier Colayco, New York, NY (US)

(73) Assignee: CLEAN CUBES LLC, New York, NY (US)

( * ) Notice: Subject to any disclaimer, the term of this patent is extended or adjusted under 35 U.S.C. 154(b) by 839 days.

(21) Appl. No.: 13/280,635

(22) Filed: Oct. 25, 2011

(65) Prior Publication Data

US 2012/0111860 A1    May 10, 2012

Related U.S. Application Data

(60) Provisional application No. 61/410,578, filed on Nov. 5, 2010.

(51) Int. Cl.
*B65D 30/08* (2006.01)
*B65D 65/46* (2006.01)

(52) U.S. Cl.
CPC .............. *B65D 31/04* (2013.01); *B65D 65/466* (2013.01)

(58) Field of Classification Search
CPC .............................. B65D 31/04; B65D 65/466
USPC .......... 220/495.01, 495.06, 495.08, 666, 6, 7; 229/117.35, 117.27; 383/61.4, 72
See application file for complete search history.

(56) References Cited

U.S. PATENT DOCUMENTS

| | | | | |
|---|---|---|---|---|
| 3,079,060 | A | * | 2/1963 | Cherrin .................... 229/117.32 |
| 3,459,357 | A | | 8/1969 | Egger et al. |
| 3,632,038 | A | | 1/1972 | Souza |
| 4,801,006 | A | | 1/1989 | Martin et al. |
| 5,116,660 | A | * | 5/1992 | Komatsu et al. .............. 428/192 |
| 5,133,607 | A | * | 7/1992 | Bonke ............................. 383/75 |
| 5,180,033 | A | | 1/1993 | Wilson |
| 5,727,499 | A | | 3/1998 | Armington et al. |
| 5,988,493 | A | * | 11/1999 | Clougherty ................. 229/164.2 |
| 6,808,073 | B2 | * | 10/2004 | Cuisinier ....................... 206/554 |
| 6,881,345 | B2 | | 4/2005 | MacQuoid |
| 7,080,750 | B2 | * | 7/2006 | Wein et al. ................ 220/495.01 |
| 7,758,243 | B2 | * | 7/2010 | Bonke ............................. 383/75 |
| 7,882,737 | B2 | * | 2/2011 | Coats et al. ...................... 73/426 |
| 7,913,721 | B2 | | 3/2011 | Henecke |
| 7,996,930 | B2 | * | 8/2011 | Carter et al. ...................... 4/484 |
| 2006/0202006 | A1 | | 9/2006 | Hou |
| 2006/0266752 | A1 | | 11/2006 | Scherer |

FOREIGN PATENT DOCUMENTS

| | | | |
|---|---|---|---|
| EP | 542143 A1 | * | 5/1993 |
| JP | 06183457 A | | 7/1994 |

* cited by examiner

*Primary Examiner* — Robert J Hicks
*Assistant Examiner* — Kareen Rush (57) ABSTRACT

A receptacle assembly has an outer member having an open top, an interior and an exterior. The outer member may be formed from biodegradable material. An inner member may be mounted in the interior of the outer member with adhesive between exterior surfaces of the inner member and the interior of the outer member. The inner member has an open top and is formed from biodegradable material.

18 Claims, 7 Drawing Sheets

FIG. 12

SYSTEM, METHOD AND APPARATUS FOR DISPOSABLE RECEPTACLE FOR REFUSE

The application claims priority to and the benefit of U.S. Prov. Pat. App. No. 61/410,578, filed Nov. 5, 2010, and is incorporated herein by reference in its entirety.

BACKGROUND OF THE INVENTION

1. Field of the Disclosure

The present invention relates in general to refuse receptacles and, in particular, to a system, method and apparatus for a disposable receptacle for refuse such as trash.

2. Description of the Related Art

Trash cans and the like are typically used to support and hold garbage liners or bags. When a bag becomes full it is removed from the garbage container and replaced with a new liner. A common practice is to remove a single liner from a roll of liners carried by the user and insert the single liner into the garbage container. Similarly, in a household or entertainment environment, numerous garbage containers may be dispersed about the household or associated property. For convenience and cost, either unsupported and unsightly garbage bags or large plastic trash cans are often used. Besides being unsightly, an unsupported garbage bag can more easily be punctured or tipped over, causing garbage leakage or spillage problems.

When a garbage container is used without a liner, garbage removal is cumbersome, as the entire garbage container and its contents need to be transported. Further, the inside of the garbage container can become soiled and in need of occasionally cleaning. To alleviate garbage container cleaning, a linerless disposable container such as a box is sometimes used. This solution, however, only provides for a one time use. Once the container is filled, the entire container and its contents are disposed of and another garbage container needs to be provided. Further, when liners are not used, if the garbage contents are wet, leaking is often an issue. Improvements in convenient, recyclable, easily maintained and transportable garbage containers continue to be of interest.

SUMMARY

Embodiments of a system, method and apparatus for a refuse receptacle are disclosed. For example, a receptacle assembly may comprise an outer member having an open top, an interior and an exterior. The outer member may be formed from biodegradable material. An inner member may be mounted in the interior of the outer member with adhesive between exterior surfaces of the inner member and the interior of the outer member. The inner member has an open top and is formed from biodegradable material.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method and apparatus for a disposable receptacle for refuse are disclosed. The following detailed description is of the best currently contemplated modes of carrying out exemplary embodiments. The description is not to be taken in a limiting sense, but is made merely for the purpose of illustrating the general principles of the embodiments, since the scope of these embodiments is best defined by the appended claims.

Broadly, an embodiment generally provides a disposable trash receptacle. Embodiments may include environmentally friendly, biodegradable disposable trash cans. Embodiments may comprise a plastic liner glued within a paper bag. Embodiments may have a number of uses in apartments and homes, as well as in various circumstances like parties and camping, when additional trash receptacles are often needed.

For example, FIGS. 1-5 disclose a receptacle assembly 10 having an outer member 12 and an inner member 14. Some embodiments also may include a draw strap or draw string pull 16. The outer member 12 may comprise a biodegradable 5 material, such as paper. The outer member 12 may comprise a paper bag, and may be formed from paper weighing about 100 g/m² to about 180 g/m² (e.g., 140 g/m²). The dimensions of the outer member 12 may vary with application. For some applications the outer member 12 may have a height of about 17 inches, a width of about 14 inches, and a depth of about 10 inches, when unfolded and substantially fully expanded. The outer member 12 may provide strength to the inner member 14, such that the inner member does not collapse after expanded.

The inner member 14 may comprise a biodegradable material, such as thin (e.g., about 0.02 mm) biodegradable plastic. For some embodiments, the inner member 14 may be water resistant or water proof. The inner member 14 may act as a moisture barrier to allow the receptacle assembly 10 to hold both dry and wet trash.

Figure 1:
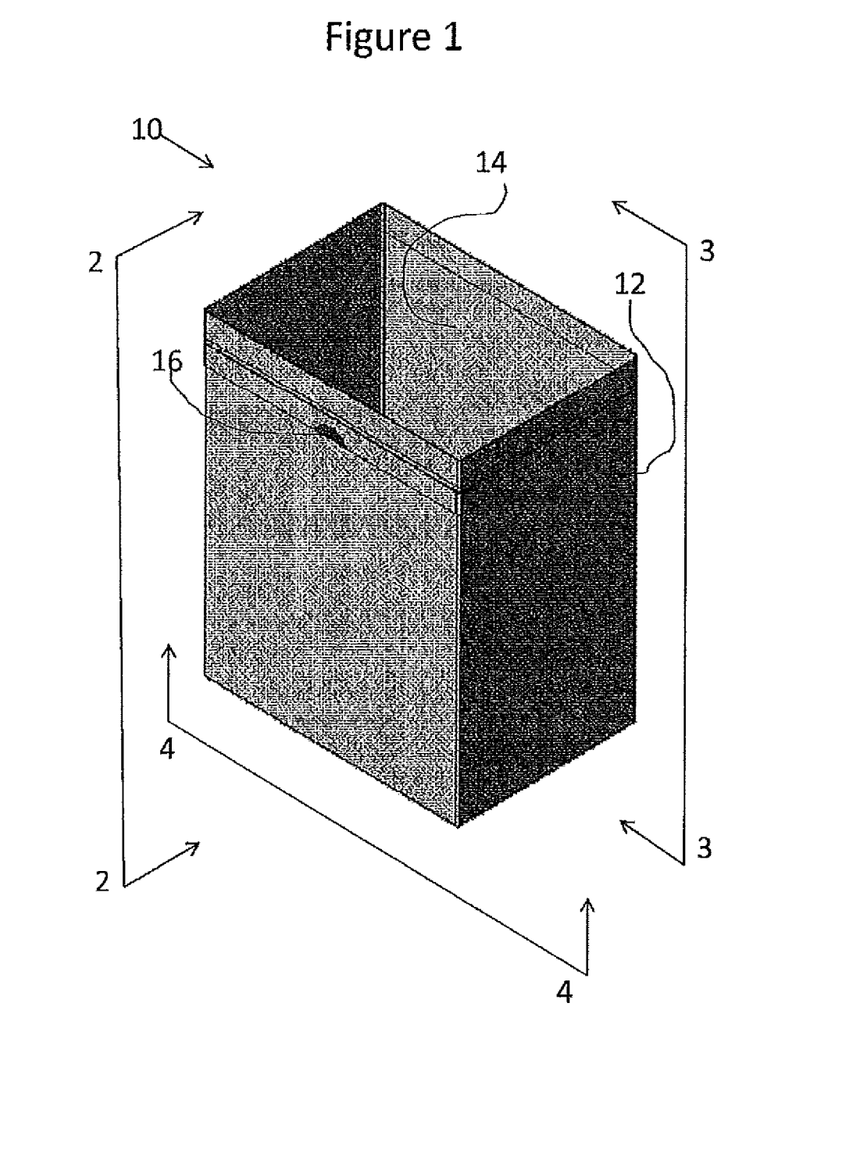
FIG. 1 is a perspective view of an embodiment of a refuse receptacle assembly.
Figure 2:
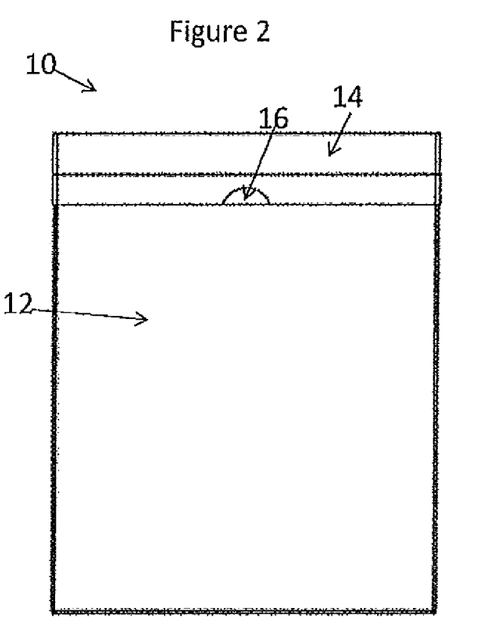
FIG. 2 is a side view of the assembly of FIG. 1.
Figure 3:
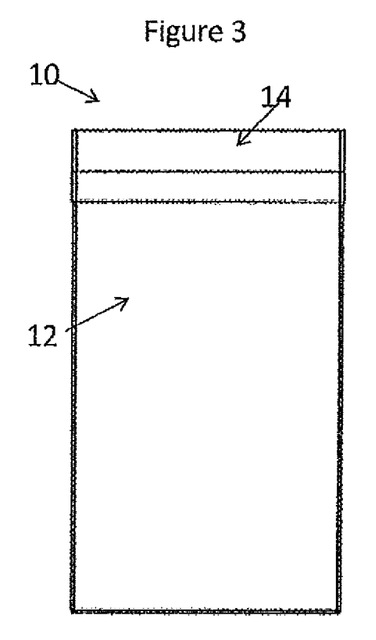
FIG. 3 is an end view of the assembly of FIG. 1.
Figure 4:
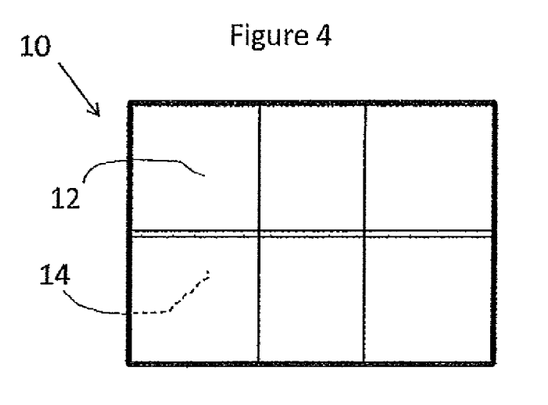
FIG. 4 is a bottom view of the assembly of FIG. 1.
Figure 5:
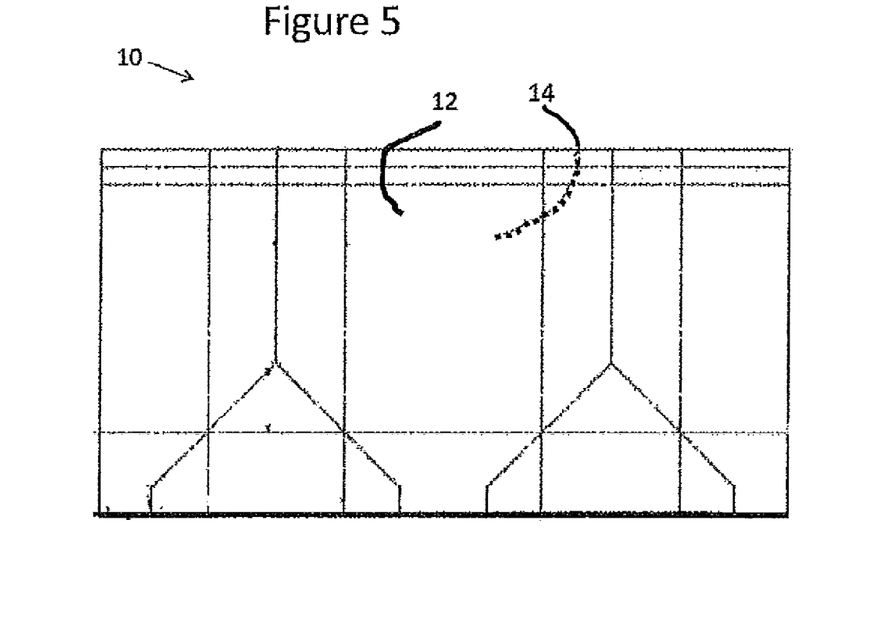
FIG. 5 is a plan view of an embodiment of an unfolded receptacle assembly.
Figure 6:
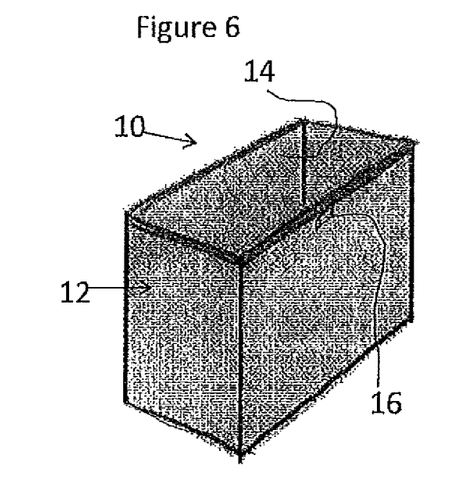
FIG. 6 is a perspective view of another embodiment of a receptacle assembly.
Figure 7:
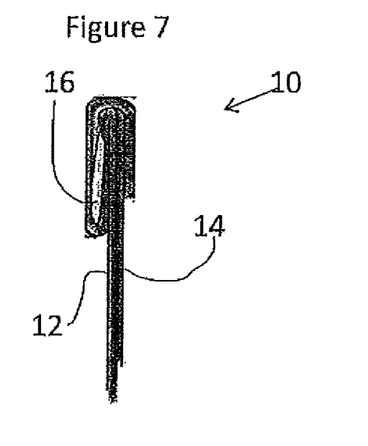
FIG. 7 is an upper sectional view of a portion of the assembly of FIG. 6.
Figure 8:
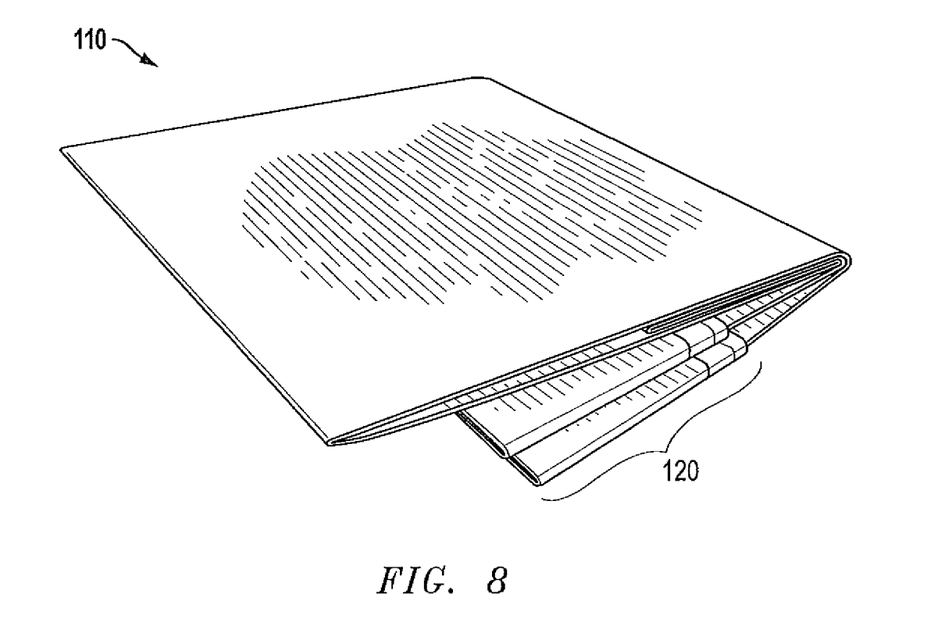
FIGS. 8 and 9 are isometric view of an embodiment of a receptacle assembly in a folded configuration.
Figure 9:
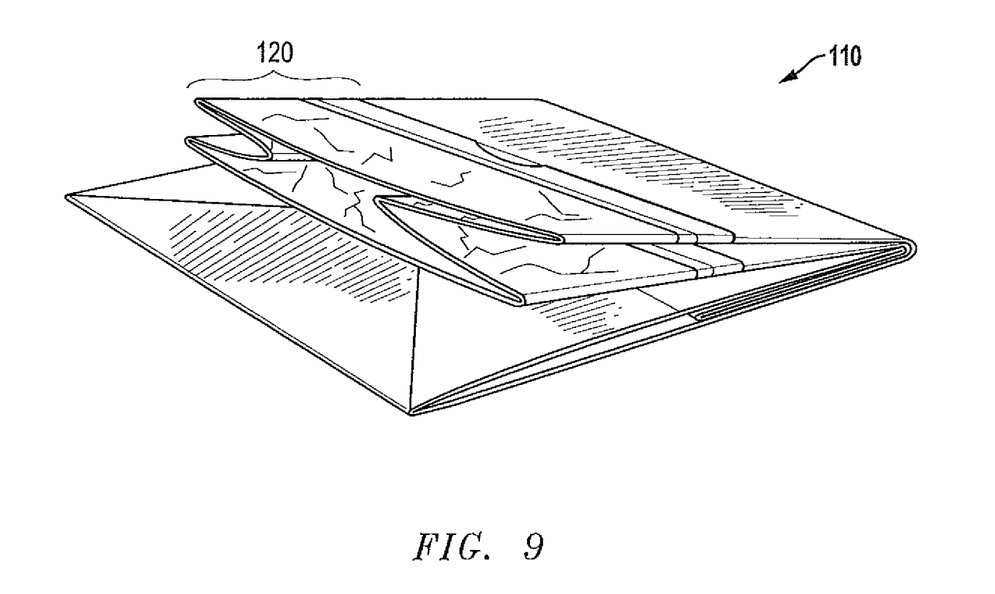

For some embodiments, the inner member 14 may overhang the outer member 12 to accommodate the drawstring 16, as shown in FIGS. 1 and 2. For some embodiments, the outer member 12 may overhang the inner member 14 and may be folded to accommodate the drawstring 16, as shown in FIGS. 6 and 7.

The inner member 14 may be affixed within the outer member 12. For some embodiments, the inner member 14 may glued within the outer member 12. For some embodiments, the inner member 14 may be affixed to the outer member 12 after the outer member 12 has been folded and formed into a bag. In other embodiments, the inner member 14 may be affixed to the outer member 12 before the outer member 12 has been folded and formed into a bag. The receptacle assembly 10 may be formed by folding paper (outer member 12), which has been pre-coated with biodegradable plastic (inner member 14), into a bag.

The drawstring 16 may be positioned in contact with the inner member 14 and positioned towards the top of the receptacle assembly 10. The drawstring 16 may comprise plastic. The drawstring 16 may allow the user to pull the receptacle assembly 10 closed when full.

Some embodiments may include decorative patterns (not shown) printed on the outer member 12. The patterns may be customized for companies or individuals wishing to have their logo or brand name on the receptacle assembly 10. During manufacturing, the receptacle assembly 10 may be assembled by gluing the inner member 14 inside of the outer member 12. The receptacle assembly 10 then may be folded and packaged for use. For these embodiments, both the outer member 12 and the inner member 14 may be formed into bag-like structures prior to being assembled into the receptacle assembly 10.

Alternatively, the receptacle assembly 10 may be assembled by coating the inner member 14 onto the outer member 12 to form coated paper. The coated paper then may be formed into the receptacle assembly 10. The receptacle assembly 10 then may be folded and packaged for use. For these embodiments, the outer member 12 and the inner member 14 may not be formed into a bag-like structures prior to being assembled into the receptacle assembly 10.

During use, a person may open the receptacle assembly 10 by unfolding, similar to opening a conventional paper grocery sack. Trash may be disposed of in the receptacle assembly 10. Both wet and dry trash can be put into the receptacle assembly 10 since the inner member 14 may prevent leaks. When the receptacle assembly 10 is substantially full of trash, the user may pull the drawstring 16 at the top of the receptacle assembly 10 to close the receptacle assembly 10. The user then may dispose of the receptacle assembly 10.

Referring now to FIGS. 8-12, another embodiment of a receptacle assembly 110 may comprise an outer member 112 having an open top, an interior and an exterior. The outer member may be formed from biodegradable material. An inner member 114 may be mounted in the interior of the outer member 112 with adhesive 115 (FIG. 10) between exterior surfaces of the inner member 114 and the interior of the outer member 112. The inner member has an open top and is formed from biodegradable material.

Figure 10:
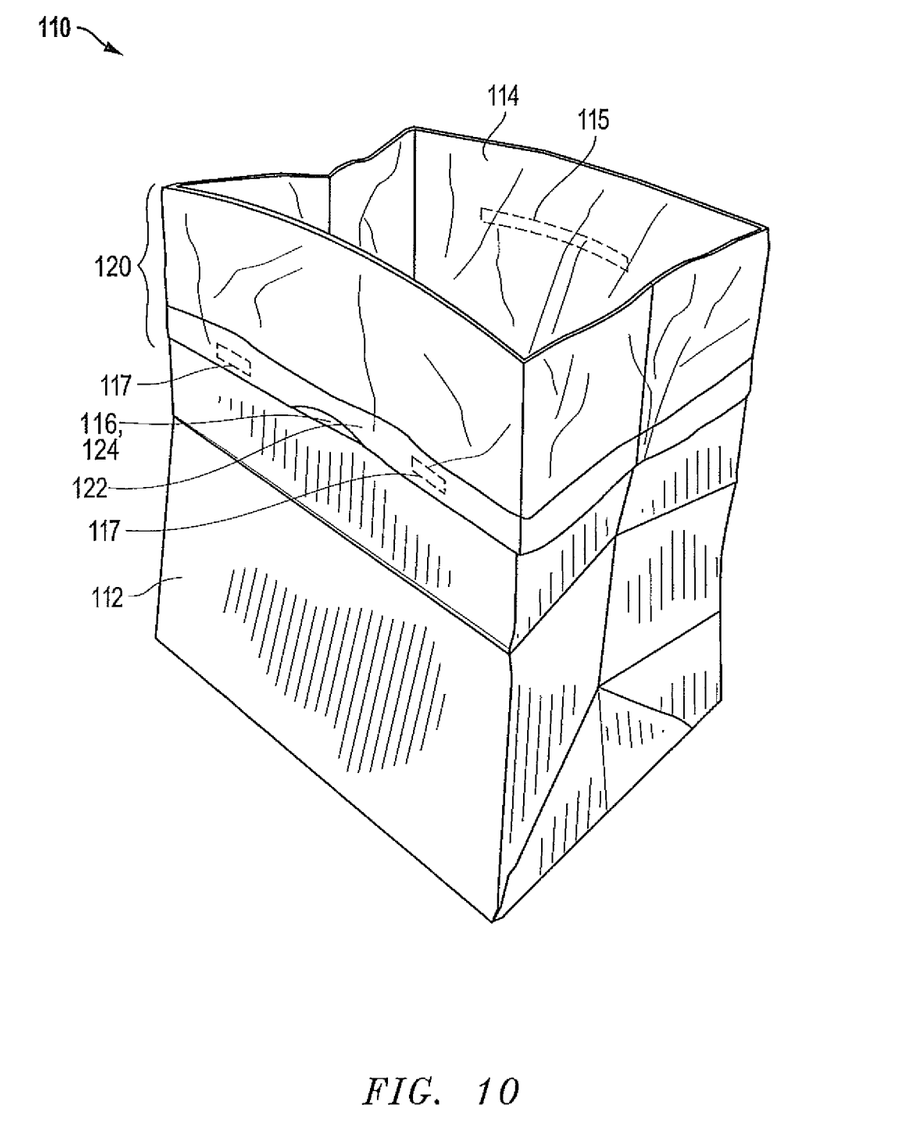
FIGS. 10 and 11 are isometric views of an embodiment of a receptacle assembly in deployed and discard configurations, respectively.
Figure 11:
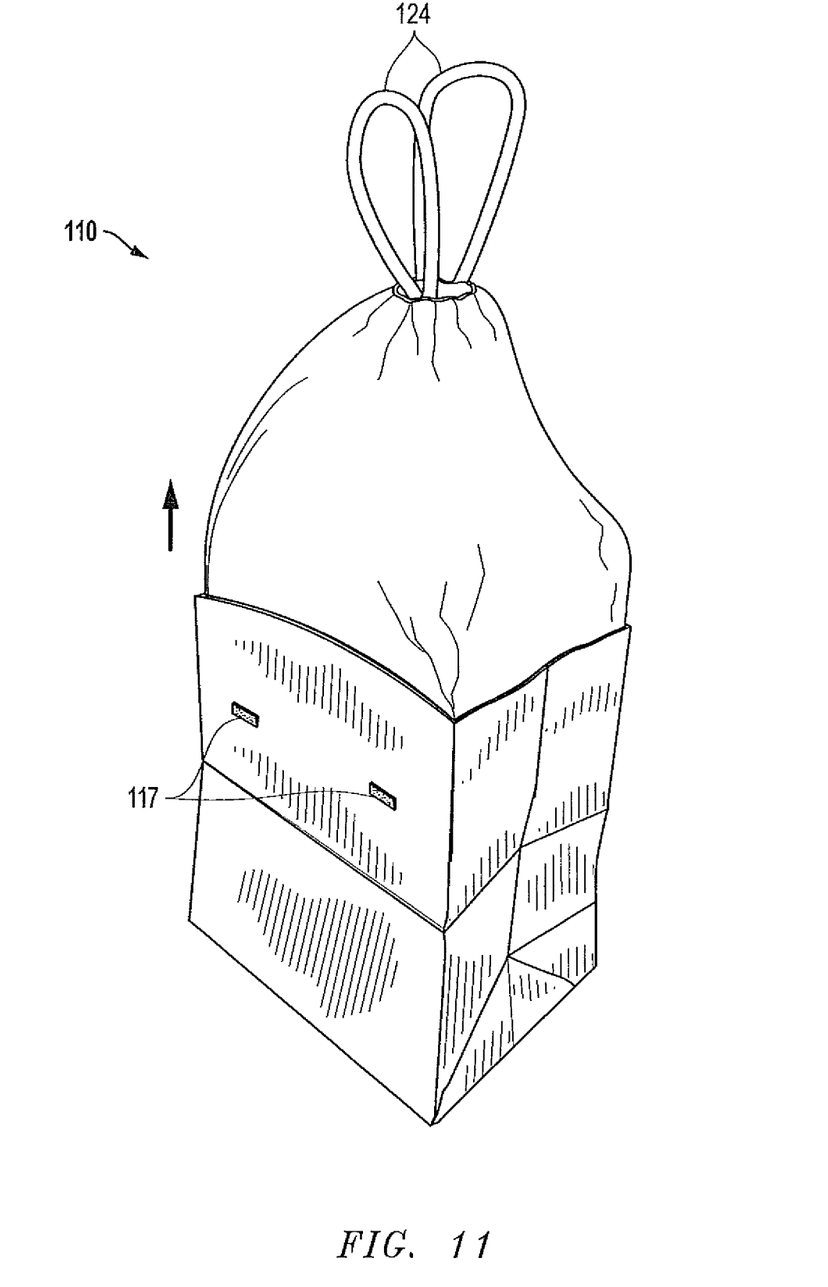

An upper portion 120 of the inner member 114 may extend out of the outer member 112, be folded over the open top of the outer member 112, and be temporarily secured to the exterior of the outer member 112 with adhesive 117 (FIGS. 10 and 11). In some embodiments, the upper portion 120 may overhang the outer member 112 by about one-fourth to one-third of the overall height of outer member 112.

The receptacle assembly 110 may have a folded configuration (FIGS. 8 and 9) wherein the inner and outer members 112, 114 are folded flat; a deployed configuration (FIG. 10) wherein the outer member 112 supports the inner member 114 in an open and upright position when a bottom of the outer member is placed on a support surface; and a discard configuration (FIG. 11) wherein the upper portion 120 of the inner member 114 is released from the outer member 112, closed and located above the open top of the outer member 112. In the discard configuration, the upper portion 120 of the inner member 114 is released from the outer member 112, closed and located above the open top of the outer member, such that the adhesive bond 117 between the upper portion 120 of the inner member 114 and the exterior of the outer member 112 is released, and the inner member 114 remains bonded to the interior of the outer member 112. Thus, the receptacle assembly may be disposed of as shown in FIG. 11 without removing inner member 114 from outer member 112.

Figure 12:
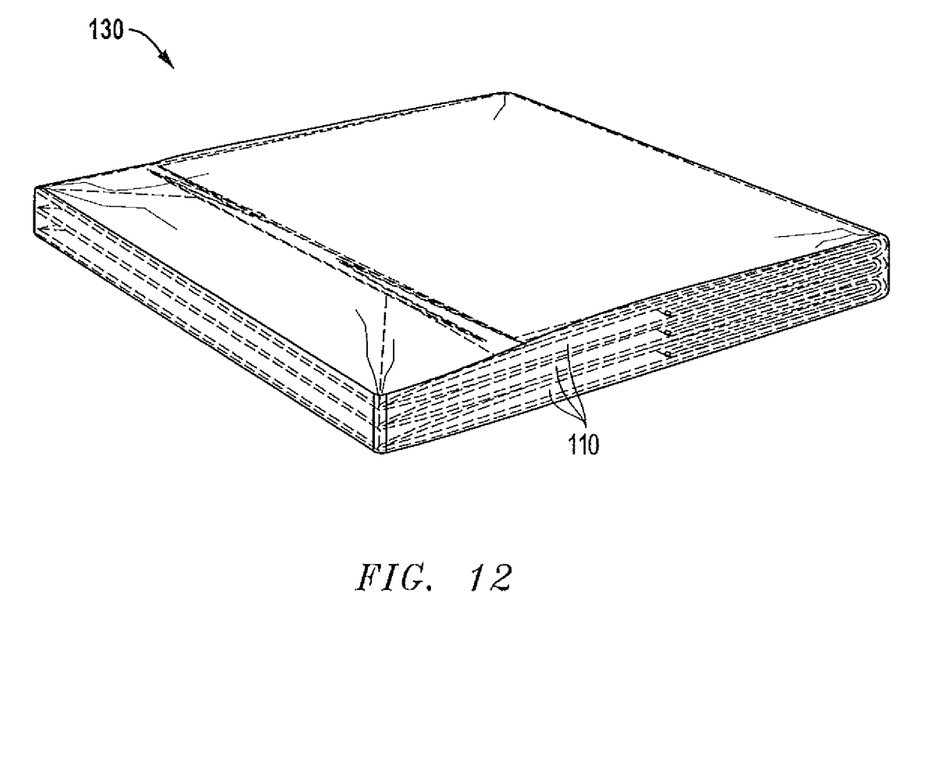
FIG. 12 is an isometric view of packing bag containing a plurality of receptacle assemblies in the folded configuration.

As shown in FIG. 12, one or more of the receptacle assemblies 110 (e.g., three shown) has a folded configuration wherein the inner and outer members 112, 114 are folded flat, and further comprise a packaging sack 130 inside which the receptacle assemblies 110 may be initially located when in the folded configuration and before use by a user.

The outer member 112 may comprise a single paper sack, the inner member 114 may comprise a single plastic bag, and the adhesive adheres a bottom of the inner member 114 to an inner bottom surface of the outer member 112. The upper portion 120 of the inner member 114 may be secured to only long outer side surfaces of the outer member 112.

The adhesive 117 between the upper portion 120 of the inner member 114 and the exterior of the outer member 112 may comprise strips of adhesive, with two of the strips 117 of adhesive being located on each of opposed outer side surfaces of the outer member 112, and said two of the strips 117 of adhesive are spaced apart from each other and from a center portion 122 of the upper portion of the inner member, such that the center portion 122 of the upper portion 120 of the inner member 114 is unattached to the outer member 112. The upper portion 120 of the inner member 114 may comprise a draw strap 116, and handles 124 for the draw strap 116 are located at the center portions 122 of the upper portion 120 of the inner member 114, such that the handles 124 are spaced apart from and unencumbered by the strips 117 of adhesive.

Another embodiment of a receptacle assembly may comprise an outer member having an open top, inner side surfaces, an inner bottom surface and outer side surfaces, and the outer member is formed from biodegradable material; an inner member mounted inside the outer member with adhesive between outer surfaces of the inner member and the inner side surfaces of the outer member, and the inner member has an open top and is formed from biodegradable material; and the receptacle assembly has a folded configuration wherein the inner and outer members are folded flat, a deployed configuration wherein the outer member supports the inner member in an open and upright position when a bottom of the outer member is placed on a support surface such that both the inner and outer members are open together and unencumbered, and a discard configuration wherein an upper portion of the inner member is released from the outer member, closed and located above the open top of the outer member.

The receptacle assembly may further comprise a substantially flat packaging sack, and the receptacle assembly is initially located therein when in the folded configuration. The outer member may comprise a single paper sack, and the inner member comprises a single plastic bag, and adhesive adheres a bottom of the inner member to the inner bottom surface of the outer member.

In the folded and deployed configurations, the upper portion of the inner member extends out of the outer member, is folded over the open top of the outer member, and is secured to the outer side surfaces of the outer member with adhesive; and in the discard configuration an adhesive bond between the upper portion of the inner member and the outer side surfaces of the outer member is released, and the inner member remains bonded to an interior of the outer member. In the folded and deployed configurations, the upper portion of the outer member is secured to only long outer side surfaces of the outer member. In the folded and deployed configurations, adhesive is located between the upper portion of the inner member and the outer side surfaces of the outer member and comprises strips of adhesive, with two of the strips of adhesive being located on opposed outer side surfaces of the outer member, and respective ones of said two of the strips of the adhesive are spaced apart from each other and from a respective center portion of the upper portion of the inner member, such that the center portions of the upper portion of the inner member are unattached to the outer member.

The upper portion of the inner member may comprise a draw strap, and handles for the draw strap are located at center portions of the upper portion of the inner member, such that the handles are spaced apart from and unencumbered by adhesive.

In yet another embodiment, a receptacle assembly may comprise an outer member comprising a single paper sack that is biodegradable and having an open top, inner side surfaces, an inner bottom surface and outer side surfaces; an inner member comprising a single plastic bag that is biodegradable and mounted inside the outer member with adhesive between outer side and bottom surfaces of the inner member and the inner side and bottom surfaces of the outer member, and the inner member has an open top with an upper end having a draw strap; and the receptacle assembly has a folded configuration wherein the inner and outer members are folded flat, a deployed configuration wherein the outer member supports the inner member in an open and upright position when a bottom of the outer member is placed on a support surface such that both the inner and outer members are open together and unencumbered, and a discard configuration wherein the upper portion of the inner member is released from the outer member, closed and located above the open top of the outer member while the inner member remains bonded to the interior of the outer member.

The receptacle assembly may further comprise a packaging sack, and the receptacle assembly comprises a plurality of receptacle assemblies stacked and initially located in the packaging sack when in the folded configuration. In the folded and deployed configurations, the upper portion of the inner member extends out of the outer member, is folded over the open top of the outer member, and is secured to the outer side surfaces of the outer member with adhesive; and in the discard configuration an adhesive bond between the upper portion of the inner member and the outer side surfaces of the outer member is released. In the folded and deployed configurations, the upper portion of the outer member is secured to only long outer side surfaces of the outer member. In the folded and deployed configurations, adhesive is located between the upper portion of the inner member and the outer side surfaces of the outer member and comprises strips of adhesive, with two of the strips of adhesive being located on opposed outer side surfaces of the outer member, and respective ones of said two of the strips of the adhesive are spaced apart from each other and from a respective center portion of the upper portion of the inner member, such that the center portions of the upper portion of the inner member are unattached to the outer member. The draw strap has handles that are located at center portions of the upper portion of the inner member, such that the handles are spaced apart from and unencumbered by adhesive.

It should be understood, of course, that the foregoing relates to exemplary embodiments and that modifications may be made without departing from the spirit and scope of the invention as set forth in the claims.

These embodiments have numerous advantages. They may be used as instant, disposable trash cans. They are biodegradable, convenient for both homes and apartments, easier to clean up and more sanitary, well suited for parties, camping, etc., and particularly useful wherever and whenever extra trash bins are needed.

For example, an embodiment of a biodegradable trash can may comprise a paper bag weighing about 140 $g/m^2$. The plastic liner bag may comprise polyethylene and have a thickness of about 0.02 mm.

The trash can may be folded and located inside a plastic packaging bag, such as polyethylene, which may have a wall thickness of about 0.04 mm. The packaging bag may comprise dimensions of about 19×15×4 inches. Approximately one to five of the folded trash cans may be located inside each packaging bag.

The refuse receptacles may be produced with adhesive, such as glue, applied to the inner side wall and bottom surfaces of the paper bag. The adhesive retains the plastic liner inside the paper bag.

On the inner side wall surfaces of the paper bag, the adhesive extends to within about three inches from the top of the paper bag, so that both the plastic bag and the paper bag may close naturally when it is ready to be disposed of.

Adhesive also may be applied to an exterior of the paper bag so that the portion of the plastic liner that overhangs the upper edge of the paper bag also is attached to the paper bag. In some versions, the exterior adhesive may be applied in one-inch strips, with five inches in between, to allow space for the user's hand to reach under and into the liner for disposal. The adhesive on the exterior may comprise a thin strip of glue, so that the liner easily lifts up and pulls away from the paper bag when the user wants to close the bag.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A receptacle assembly, comprising:
   an outer member having an open top, an interior and an exterior, and the outer member is formed from biodegradable material;
   an inner member mounted in the interior of the outer member with adhesive between exterior surfaces of the inner member and the interior of the outer member, and the inner member has an open top and is formed from biodegradable material; and
   an upper portion of the inner member extends out of the outer member, is folded over the open top of the outer member, and the inner member remains attached to the outer member such that the receptacle assembly is disposed of without removing inner member from outer member; and
   the receptacle assembly has a folded configuration wherein the inner and outer members are folded flat, and a deployed configuration wherein the outer member supports the inner member in an open and upright position when a bottom of the outer member is placed on a support surface.

2. A receptacle assembly according to claim 1, wherein the receptacle assembly also has a discard configuration wherein the upper portion of the inner member is released from the outer member, closed and located above the open top of the outer member.

3. A receptacle assembly according to claim 1, further comprising a packaging sack inside which the receptacle assembly is initially located when in the folded configuration.

4. A receptacle assembly according to claim 1, wherein the outer member comprises a single paper sack, the inner member comprises a single plastic bag, and the adhesive adheres a bottom of the inner member to an inner bottom surface of the outer member.

5. A receptacle assembly according to claim 1, wherein the receptacle assembly has a discard configuration wherein the upper portion of the inner member is released from the outer member, closed and located above the open top of the outer member, such that an adhesive bond between the upper portion of the inner member and the exterior of the outer member is released, and the inner member remains bonded to the interior of the outer member.

6. A receptacle assembly according to claim 1, wherein the upper portion of the inner member is secured to only long outer side surfaces of the outer member.

7. A receptacle assembly according to claim 1, wherein the adhesive between the upper portion of the inner member and the exterior of the outer member comprises strips of adhesive, with two of the strips of adhesive being located on each of opposed outer side surfaces of the outer member, and said two of the strips of adhesive are spaced apart from each other and from a center portion of the upper portion of the inner member, such that the center portion of the upper portion of the inner member is unattached to the outer member.

8. A receptacle assembly according to claim 7, wherein the upper portion of the inner member comprises a draw strap, and handles for the draw strap are located at the center portions of the upper portion of the inner member, such that the handles are spaced apart from and unencumbered by the strips of adhesive.

9. A receptacle assembly, comprising:
   an outer member having an open top, inner side surfaces, an inner bottom surface and outer side surfaces, and the outer member is formed from biodegradable material;
   an inner member mounted inside the outer member with adhesive between outer surfaces of the inner member and the inner side surfaces of the outer member, and the inner member has an open top and is formed from biodegradable material; and
   the receptacle assembly has a folded configuration wherein the inner and outer members are folded flat, a deployed configuration wherein the outer member supports the inner member in an open and upright position when a bottom of the outer member is placed on a support surface such that both the inner and outer members are open together and unencumbered, and a discard configuration wherein an upper portion of the inner member is released from the outer member, closed and located above the open top of the outer member; and
   the outer member comprises a single paper sack, the inner member comprises a single plastic bag, adhesive adheres the inner member to the outer member such that the inner member remains attached to the outer member and the receptacle assembly is disposed of without removing inner member from outer member.

10. A receptacle assembly according to claim 9, further comprising a substantially flat packaging sack, and the receptacle assembly is initially located therein when in the folded configuration, and the outer member is a paper bag comprising about 100 g/m$^2$ to about 180 g/m$^2$.

11. A receptacle assembly according to claim 9, wherein in the folded and deployed configurations, the upper portion of the inner member extends out of the outer member, is folded over the open top of the outer member, and is secured to the outer side surfaces of the outer member with adhesive; and in the discard configuration an adhesive bond between the upper portion of the inner member and the outer side surfaces of the outer member is released, and the inner member remains bonded to an interior of the outer member.

12. A receptacle assembly according to claim 9, wherein in the folded and deployed configurations, the upper portion of the inner member is secured to only long outer side surfaces of the outer member.

13. A receptacle assembly according to claim 9, wherein in the folded and deployed configurations, adhesive is located between the upper portion of the inner member and the outer side surfaces of the outer member and comprises strips of adhesive, with two of the strips of adhesive being located on opposed outer side surfaces of the outer member, and respective ones of said two of the strips of the adhesive are spaced apart from each other and from a respective center portion of the upper portion of the inner member, such that the center portions of the upper portion of the inner member are unattached to the outer member.

14. A receptacle assembly according to claim 9, wherein the upper portion of the inner member comprises a draw strap, and handles for the draw strap are located at center portions of the upper portion of the inner member, such that the handles are spaced apart from and unencumbered by adhesive.

15. A receptacle assembly, comprising:
   an outer member comprising a single paper sack that is biodegradable and having an open top, inner side surfaces, an inner bottom surface and outer side surfaces;
   an inner member comprising a single plastic bag that is biodegradable and mounted inside the outer member with adhesive between outer side and bottom surfaces of the inner member and the inner side and bottom surfaces of the outer member, and the inner member has an open top with an upper end having a draw strap; and
   the receptacle assembly has a folded configuration wherein the inner and outer members are folded flat, a deployed configuration wherein the outer member supports the inner member in an open and upright position when a bottom of the outer member is placed on a support surface such that both the inner and outer members are open together and unencumbered, and a discard configuration wherein the upper portion of the inner member is released from the outer member, closed and located above the open top of the outer member while the inner member remains bonded to the interior of the outer member, such that the receptacle assembly is disposed of without removing inner member from outer member; and
   a packaging sack, and the receptacle assembly comprises a plurality of receptacle assemblies stacked and initially located in the packaging sack when in the folded configuration.

16. A receptacle assembly according to claim 15, wherein in the folded and deployed configurations, the upper portion of the inner member extends out of the outer member, is folded over the open top of the outer member, and is secured to the outer side surfaces of the outer member with adhesive; and in the discard configuration an adhesive bond between the upper portion of the inner member and the outer side surfaces of the outer member is released, and the outer member is a paper bag comprising about 100 g/m$^2$ to about 180 g/m$^2$.

17. A receptacle assembly according to claim 15, wherein in the folded and deployed configurations, the upper portion of the inner member is secured to only long outer side surfaces of the outer member, and the draw strap has handles that are located at center portions of the upper portion of the inner member, such that the handles are spaced apart from and unencumbered by adhesive.

18. A receptacle assembly according to claim 15, wherein in the folded and deployed configurations, adhesive is located between the upper portion of the inner member and the outer side surfaces of the outer member and comprises strips of adhesive, with two of the strips of adhesive being located on opposed outer side surfaces of the outer member, and respective ones of said two of the strips of the adhesive are spaced apart from each other and from a respective center portion of the upper portion of the inner member, such that the center portions of the upper portion of the inner member are unattached to the outer member.

* * * * *